Figure 1:
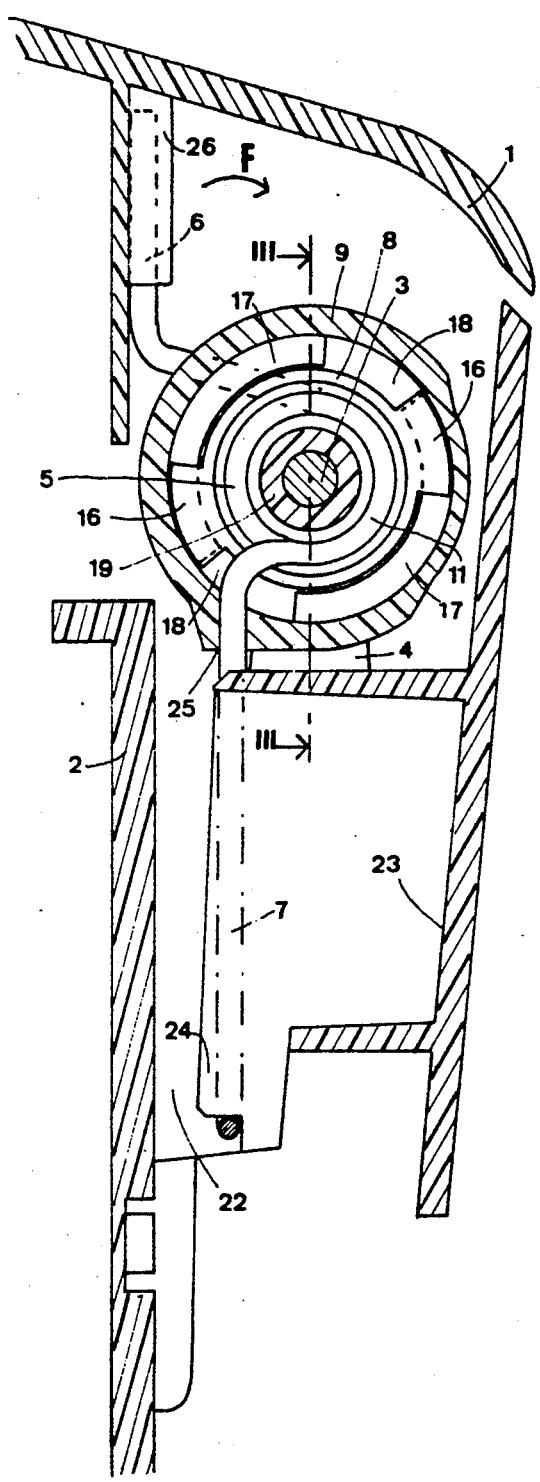

United States Patent [19]

Jacob et al.

[11] Patent Number: 5,033,162
[45] Date of Patent: Jul. 23, 1991

[54] HINGE FOR THE COVER OF A COOKING VAT

[75] Inventors: Robert C. J. Jacob; Sylvain A. B. Giffard, both of Cormelles-le-Royal, France

[73] Assignee: Moulinex (Societe Anonyme), Bagnolet, France

[21] Appl. No.: 534,021

[22] Filed: Jun. 6, 1990

[30] Foreign Application Priority Data

Jul. 7, 1989 [FR] France .................. 89 09211

[51] Int. Cl.⁵ .................. E05F 1/08
[52] U.S. Cl. .................. 16/303; 16/306; 16/342
[58] Field of Search .......... 16/306, 307, 82, 85, 16/308, 341, 342

[56] References Cited

U.S. PATENT DOCUMENTS

| | | | |
|---|---|---|---|
| 3,955,241 | 5/1976 | Little | 16/306 |
| 4,193,164 | 3/1980 | Okayama | 16/307 |
| 4,215,449 | 8/1980 | Loikitz | 16/303 |
| 4,408,799 | 10/1983 | Bowman | 16/342 |
| 4,524,438 | 6/1985 | Einhaus | 16/306 |

*Primary Examiner*—Kurt Rowan
*Assistant Examiner*—Chuck Y. Mah
*Attorney, Agent, or Firm*—Young & Thompson

[57] ABSTRACT

A hinge for a cover of a cooking vat, comprising an axle (3) mounted on a bearing (4) secured to the vat and on which pivots the cover, as well as at least one compressible coil spring (5) whose one end (6) is secured to the cover (1) and whose other end (7) is connected to the vat (2). The spring (5) comprises a braking device which comprises a first and a second element (8 and 9) connected for relative rotation, respectively to the ends (6, 7) of the spring and comprising couping means having cam surfaces (12, 13) for axial driving and for braking adapted to compress the spring (5) so as to obtain a shock absorption at the end of the opening movement of the cover. The hinge is applicable particularly to the covers of electric deep fat fryers.

7 Claims, 2 Drawing Sheets

HINGE FOR THE COVER OF A COOKING VAT

The invention relates to hinges for covers of cooking vats, such as for example deep fat fryers, and comprises an axle mounted horizontally in a bearing secured to the vat and on which pivots the cover.

It relates more particularly to a hinge comprising at least one coil spring mounted concentrically to the axle and whose one so-called free end is secured to the cover and whose other so-called fixed end is connected to the wall of the vat such that the spring is in torsion when the cover is maintained in closed position by means of a catch on the vat, and practically without torsion when the cover occupies an open position after releasing the catch.

With a hinge of this type, it will be seen that when the catch is opened, the cover is abruptly moved under the effect of the spring toward its open position and at the end of its movement bangs against the vat which can spill oil.

To overcome this drawback, it has already been proposed to provide these covers with devices for braking their opening. But these devices are not entirely satisfactory, not only because they too greatly retard the opening of the cover, but also because they require complex delicately adjusted mechanisms because their mechanical characteristics are influenced by the high temperature prevailing in the cooking vat.

The invention has for its object to overcome these drawbacks.

According to the invention, the coil spring is compressible and comprises a braking device which comprises first and second elements concentric to the spring and bearing respectively on the two end turns and of which the first element is connected rotatably with the free end of the spring, while the second element is connected to the fixed end of said spring, the two elements comprising mutual coupling means which are adapted to displace axially, at least at the end of movement of the cover, one of the elements relative to the other, in the opposite direction of the increasing antagonistic force resulting from the compression of the spring by said elements and which comprise for this purpose abutment surfaces for axial driving and for braking, thereby cushioning the expansion of the spring.

It will thus be understood that thanks to the use of the same spring to effect the functions of automatic opening and of braking of the cover, there is provided a particularly simple and economical spring ensuring high security of operation of the cover and eliminating all shock at the end of its path of movement.

Figure 3:
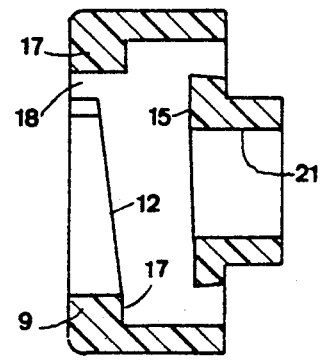
Figure 4:
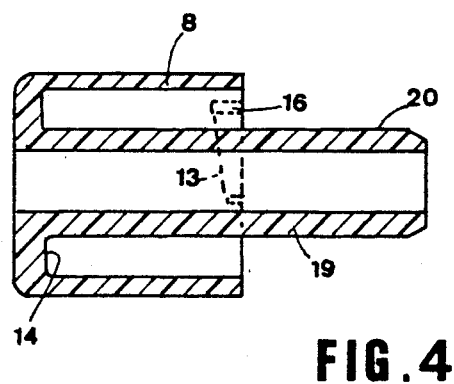
Figure 2:
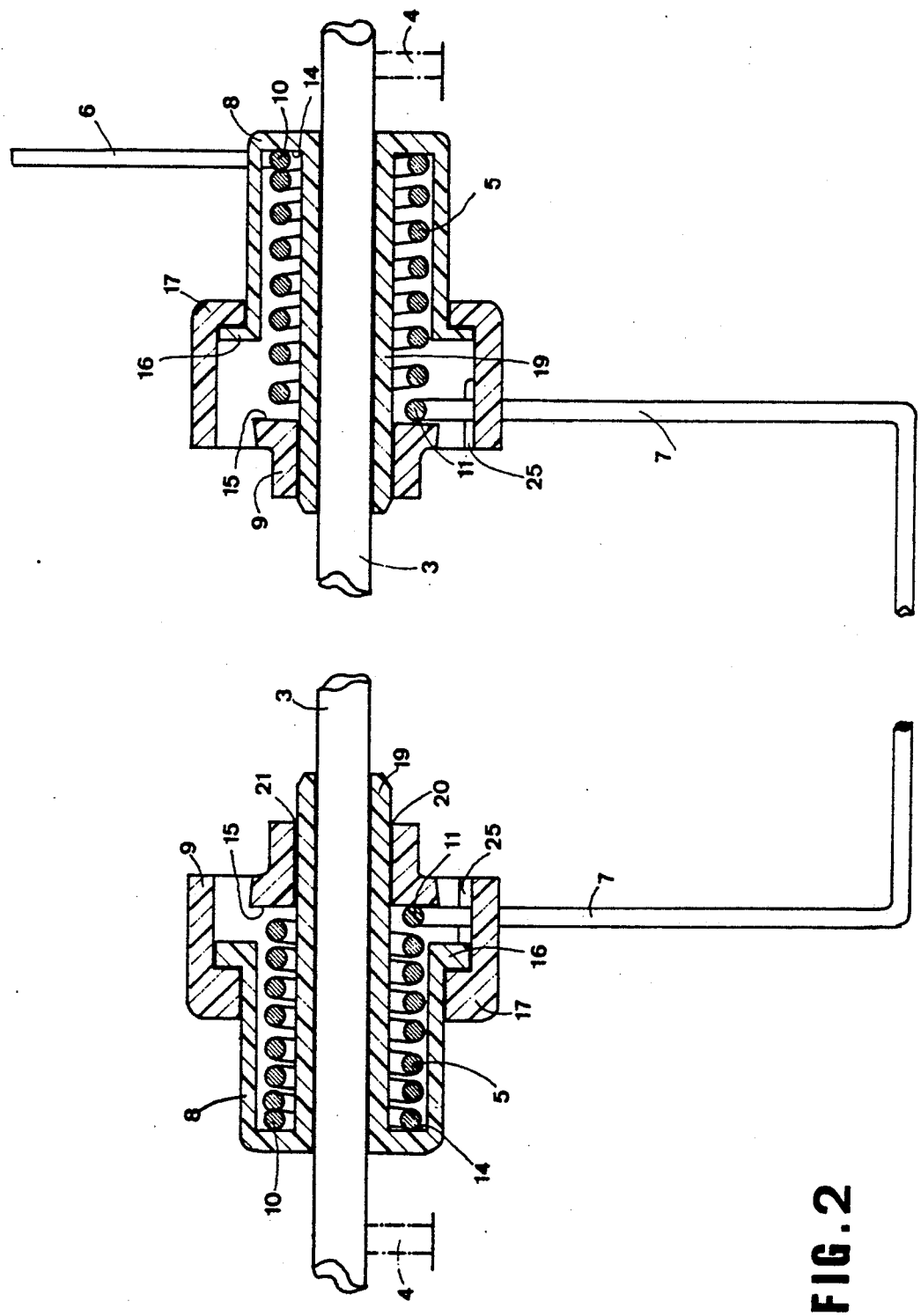

The characteristics and advantages of the invention will be further apparent from the description which follows, by way of example, with reference to the accompanying drawings, in which:

FIG. 1 is a schematic view partially in vertical section of a cooking vat and of its cover provided with a hinge according to the invention;

FIG. 2 is a vertical sectional view of the hinge provided with two braking devices applied respectively to the springs and showing in the left portion the braking device with the cover open and at the right portion the braking device with the cover closed; and FIGS. 3 and 4 show in vertical section on the line III—III of FIG. 1, respectively the second and first elements comprising a part of the braking device of the hinge.

The hinge shown in FIG. 1 is mounted between a cover 1 and a vat 2 of a cooking device such as an electric deep fat fryer and comprises an axle 3 mounted horizontally in a bearing 4 (shown schematically in broken lines in FIG. 2) secured to the vat and on which pivots the cover, as well as two coil springs 5 mounted spaced apart and concentric with axle 3. Each spring 5 comprises a so-called free end 6 attached to the cover 1 and another so-called fixed end 7 connected to the wall of the vat 2 such that the spring 5 will be in torsion when the cover is maintained closed by means of a catch (not shown) secured to the vat and provided in a region opposite the hinge, and practically free from torsion when the cover occupies an open position after releasing the catch (FIG. 1 and the right portion of FIG. 2).

According to the invention, each coil spring 5 is compressible and comprises a braking device which comprises first and second elements 8 and 9 arranged concentrically of spring 5 and bearing respectively on the two end turns 10, 11, and of which the first element 8 is connected in rotation with the free end 6 of the spring, while the second element 9 is connected to the fixed end 7 of said spring, the two elements comprising mutual coupling means which are adapted to displace axially, at least at the end of the movement of the cover, one of the elements relative to the other, against the antagonistic increasing force resulting from the axial compression of the spring 5 by said elements 8 and 9 and which comprise bearing surfaces 12, 13 for axial drive and for braking, thereby cushioning the expansion of the spring.

As will be seen from FIGS. 2 to 4, the first and second elements 8 and 9 are comprised by two tubular concentric members each comprising a base 14, 15 bearing on one of the end turns 10, 11 of the spring and whose free edges bear mutual coupling means which comprise respectively on the first and second elements (8 and 9), a pair of radial hooks 16 directed outwardly and diametrically opposed relative to the axle 3 and a pair of radial lugs 17 directed inwardly and also diametrically opposed relative to the axle 3 and which nest within each other by their adjacent surfaces, the two pairs of lugs 17 and hooks 16 carrying respectively on their surfaces cams 12, 13 of complementary profile and thus comprising the abutment surfaces 12, 13 for axial driving and braking. These abutment surfaces 12, 13 are thus disposed transversely to the axle 3 and with an increasing slope in the direction of opening rotation of the cover (arrow F). Moreover the complementarity of the profile of the cams ensures optimum friction between said bearing surfaces.

As best seen in FIG. 1, the two lugs 17 extend respectively over two circular sectors concentric to the axle 3 and the two hooks 16 also extend over two circular sectors concentric to said axle, the angular gaps 18 between the lugs 17 having an angular extent greater than the angular extent of the hooks 16, thereby to permit assembly by bayonet connection of the first and second elements 8 and 9.

Moreover, to increase the effectiveness of shock absorption, the cams 12, 13 extend respectively about substantially all the periphery of the sectors of the lugs 17 and the hooks 16.

So as to ensure greater rigidity of the assembly comprised by the spring 5 and the first and second elements 8 and 9, as well as the mounting of this assembly about the axle 3, the invention provides that the first element 8 comprises in the central region of its base 14 an axial tubular hub 19 which is disposed about the axle 3, whose end projects from this tubular piece, such as to constitute by its external surface a bearing 20 for the second tubular member 9 whose bottom 15 has for this purpose a central opening 21.

To facilitate the mounting of the spring on the vat and to make easier the cleaning of the apparatus the invention provides, on the one hand, that the two springs 5 are interconnected by their fixed ends 7 so as to constitute a U-shaped frame which is removably secured in a recess 22 provided between the external wall of the vat 2 and a lateral hinge bearing support 23, said frame for this purpose locking onto a projection 24 carried by the internal surface of the support 23, while the bearing 4 that receives the axle 3 is upwardly open so as to maintain said axle in traction on this bearing by means of the bracket provided by interconnected ends 7 which grips the projection 24.

The mounting and operation of this spring will now be explained. Over each spring 5 there is inserted, on the one hand, on the end 10 of the spring the first element 8 which is fixed in rotation on the free end 6 of this spring which passes for this purpose into a longitudinal groove not shown, and on the other hand, on the end 11 of this spring, the second element 9 which is fixed in rotation on the fixed end 7 of this spring which for this purpose passes into a groove 25 of the element 9. The hooks 16 are moved into registry with the gaps 18, and axial pressure is exerted to compress the assembly. Then by a rotative movement there is effected a bayonet assembly of the hooks 16 beneath the lugs 17 so as to enclose the spring between these two elements 8 and 9. There is thus provided a sub-assembly which is fixed by its free ends 9 in the small recess 26 of the cover, and by its axle 3 which engages in pivots (not shown) of the cover. Then the frame interconnecting ends 7 is introduced into the recess 22 so as to obtain by elastic deformation its automatic latching on the projection 23 and thus at the same time the maintenance of the axle 3 on the bearing 4.

The cover being in its position shown in FIG. 1, it will be understood that, as soon as the cover is unlatched, the end 6 of each spring is quickly moved rearwardly (arrow F) and rotates the first element 8 whose hooks 16 engage farther forward beneath the lugs 17 of the second element 9.

Each cam 13 thus traverses by rotation the corresponding slope of the cam 12 in the opposite direction so as to drive the elements 8 and 9 toward each other to compress the spring 5 (left portion of FIG. 2).

The spring 5 thus opposes an increasing antagonistic force which both increases the friction between said cams and progressively opposes the rising of the cam 13 to the summit of the cam 12 thereby effecting in the final movement of the cover a substantially complete shock absorption of the expansion of this spring until it is substantially without torsion, thereby avoiding excessive pivoting of the cover rearwardly which could upset the vat or spill oil.

What is claimed is:

1. In a hinge for a cover (1) of a vat (2) of a cooking apparatus, comprising an axle (3) mounted horizontally in a bearing (4) secured to the vat and on which the cover pivots, as well as at least one coil spring (5) mounted concentrically to the axle (3) and having a free end (6) secured to the cover (1) and a fixed end (7) connected to the vat (2) such that the spring (5) will be in torsion when the cover is maintained in closed position and substantially free from torsion when the cover occupies an open position; the improvement in which the spring (5) is compressible and comprises a braking device which comprises a first and a second element (8 and 9) disposed concentrically of the spring (5) and bearing respectively on two end turns (10, 11) of the spring, said first element (8) being connected in rotation with said free end (6) of the spring, while the second element (9) is connected to the fixed end (7) of said spring, the two elements comprising mutual coupling means which are adapted to displace axially, at least during the final opening movement of the cover, one of the elements relative to the other, in the opposite direction to the increasing antagonistic force resulting from the compression of the spring (5) by said elements (8, 9), said elements (8, 9) having interengaging cam surfaces (12, 13) for axial drive and shock absorbing braking of the expansion of the spring, such that when said cover rises, said elements are turned relative to each other in a direction that causes said cam surfaces (12, 13) to slide on each other to move said elements axially toward each other to compress said spring.

2. Hinge according to claim 1, wherein the first and second elements (8 and 9) are comprised by two concentric tubular members which each comprising a base (14, 15) bearing on one of the end turns (10, 11) of the spring and having free edges that carry mutual coupling means which comprise respectively on the first and second elements (8 and 9), a pair of radial hooks (16) directed outwardly and diametrically opposed relative to the axle (3) and a pair of radial lugs (17) directed inwardly and also diametrically opposed relative to the axle (3) and which engage beneath each other by their adjacent surfaces, one at least of said pairs (16, 17) having respectively on its surfaces said cam surfaces (12, 13) which are thus disposed transversely of the axle (3) and which extend axially according to an increasing slope in the direction of rotation of opening of the cover.

3. Hinge according to claim 2, wherein the two lugs (17) extend respectively about two sectors of a circle concentric to the axle (3) and the two hooks (16) also extend about two sectors of a circle concentric to said axle, there being angular gaps (18) comprised between the lugs (17) having an angular extent greater than the angular extent of the hooks (16), so as to permit a bayonet assembly of the first and second elements (8 and 9).

4. Hinge according to claim 2, wherein the cam surfaces (12, 13) are of complementary profile.

5. Hinge according to claim 2, wherein the first element (8) comprises in the central region of its base a tubular axial hub (19) which is mounted about the axle (3) and whose end projects from the tubular member, such as to constitute by its external surface a bearing (20) for the second tubular member (9) whose base (15) has for this purpose a central opening (21).

6. Hinge according to claim 1, there being two said springs (5) spaced from each other and interconnected by their fixed ends (7) to constitute a U-shaped frame which is removably secured in a recess (22) provided between an external wall of the vat (2) and a lateral hinge bearing support (23), said frame for this purpose gripping a projection (24) carried by the internal surface of said support (23).

7. Hinge according to claim 6, wherein a bearing (4) for reception of the axle (3) is upwardly open so as to maintain said axle in traction on the bearing by means of the frame which grips the projection (24).

* * * * *